United States Patent [19]
Brickner, Jr. et al.

[11] Patent Number: 6,012,373
[45] Date of Patent: Jan. 11, 2000

[54] COMPOSITE MATERIAL C-ARM SCROLL SAW

[75] Inventors: Louis C. Brickner, Jr.; Barry D. Wixey, both of Pittsburgh, Pa.

[73] Assignee: Delta International Machinery Corp., Pittsburgh, Pa.

[21] Appl. No.: 08/870,886

[22] Filed: Jun. 6, 1997

Related U.S. Application Data

[63] Continuation of application No. 08/530,774, Sep. 19, 1995, abandoned.

[51] Int. Cl.⁷ ........................................................ B27B 3/00
[52] U.S. Cl. .................................. 83/783; 83/784; 83/786; 83/662; 83/859
[58] Field of Search ........................... 83/782, 783, 784, 83/785, 786, 859, 662

[56] References Cited

U.S. PATENT DOCUMENTS

| | | |
|---|---|---|
| Re. 7,726 | 6/1877 | Plummer . |
| D. 85,847 | 12/1931 | Tautz . |
| D. 292,713 | 11/1987 | Miller . |
| 1,848,540 | 3/1932 | Nicklos et al. . |
| 2,721,587 | 10/1955 | Dremel . |
| 2,731,988 | 1/1956 | Steiner . |
| 4,557,171 | 12/1985 | Stolzer . |
| 4,616,541 | 10/1986 | Eccardt et al. . |
| 4,681,006 | 7/1987 | Miller . |
| 4,825,741 | 5/1989 | Wellington et al. . |
| 4,903,410 | 2/1990 | Wieninger et al. . |
| 4,913,861 | 4/1990 | Mishima et al. . |
| 4,949,616 | 8/1990 | Chang . |
| 5,016,512 | 5/1991 | Huang . |
| 5,058,280 | 10/1991 | Pollack et al. . |
| 5,088,369 | 2/1992 | Rice et al. . |
| 5,235,890 | 8/1993 | Mathre . |
| 5,249,818 | 10/1993 | Patterson . |
| 5,363,733 | 11/1994 | Baird et al. . |
| 5,410,933 | 5/1995 | Miyamoto et al. . |

FOREIGN PATENT DOCUMENTS

| | | |
|---|---|---|
| 967129 | 8/1964 | United Kingdom . |

OTHER PUBLICATIONS

Novelty Search Report, dated Oct. 16, 1996, prepared by German Patent Office in German Patent Application No. 196 05 116.9, a foreign counterpart to the present application's parent application Serial No. 08/530,774.

"The New Constant Tension Scroll Saws," *Wood Magazine* (Dec. 1985), depicting scroll saws distributed by Sears, Hegner, AMT, Excalibur, Woodmaster, Delta and RBI.

Pittman, *Woodworker's Buyer's Guide to Power Tools* (undated), depicting scroll saws distributed by Hegner, Craftsman, Delta, J. Philip Humfrey, Jet, Vega and Woodmaster.

Instruction Manual for Delta 18" Scroll Saw, dated Oct. 1989.

Seyco Excalibur 19 Scroll Saw depicted on p. 13 of *The Woodworker's Journal* (Jan./Feb. 1993).

Delta International Machinery Catalog dated Jan. 1993 depicting Delta model Nos. 40–601, 40–406, and 40–441 scroll saws.

*Primary Examiner*—M. Rachuba
*Attorney, Agent, or Firm*—Kirkpatrick & Lockkhart LLP

[57] ABSTRACT

A scroll saw having a yoke for mounting a saw blade thereto, the yoke adapted to be received by a mounting support on the reciprocating saw. The yoke includes first and second arms and a region connecting the first and second arms, the first and second arms having ends for receiving the end of a saw blade. The first and second arms and the connecting region are formed of a composite material.

22 Claims, 17 Drawing Sheets

COMPOSITE MATERIAL C-ARM SCROLL SAW

This a divisional application of U.S. patent application Ser. No. 08/530,774 filed on Sep. 19, 1995 now abandoned.

BACKGROUND OF THE INVENTION

1. Field of the Invention

The present invention relates generally to scroll saws or jig saws and, more particularly, relates to scroll saws or jig saws having a saw blade that is connected between the free ends of a generally C-shaped or U-shaped yoke which is driven to reciprocate at a pivot point located at the yoke's rear or center. The present invention also relates generally to apparatus for tensioning a saw blade between the free ends of a generally C-shaped or U-shaped yoke typically incorporated in a scroll saw or jig saw.

The terms scroll saw and jig saw will be used interchangeably in the following description of the invention and it is intended that either term refers generally to any device wherein an elongate saw blade (i.e., a saw blade having a length significantly greater than a width) is connected between the free ends of a yoke which is driven to reciprocate at a pivot point located generally at the yoke's rear or center. Also, the terms C-arm and yoke are used interchangeably in the following description of the invention to refer to the generally C-shaped or U-shaped member typically incorporated in a scroll saw or jig saw to retain a saw blade.

2. Description of the Invention Background

Scroll saws and jig saws typically include a substantially C-shaped or U-shaped member or yoke that reciprocates around a pivot point at the yoke's rear or center. The substantially C-shaped or U-shaped yoke comprises two substantially parallel arms connected by a bight portion. A saw blade is connected between the free ends of the two arms and is driven by a motor to reciprocate to thereby cut a workpiece. The yoke must transfer the force generated by the motor to the saw blade and must be sufficiently stiff to maintain proper tension on the saw blade. The yoke must also withstand heavy cyclic stresses, especially when the machine is under heavy load. Accordingly, yokes incorporated in prior art scroll saws and jig saws have been manufactured of a metal such as steel or aluminum and are, therefore, quite heavy. As an example, the metal two-armed C-shaped yoke of a typical 18" scroll saw may weigh three pounds or more.

The metal yoke's significant weight places a significant load on the bracket and bearing members about which the yoke reciprocates and may contribute to premature failure of those members. The significant weight of a metal yoke also produces a large amount of vibration during reciprocation. The vibration may reduce the cutting precision of the machine and make intricate cuts impossible. To counter vibrations, almost all prior art scroll saws or jig saws incorporate a counter-rotating balancing mechanism at the reciprocating bearings coupling the motor to the yoke. One example of such a counterbalance mechanism is provided in U.S. Pat. No. 4,949,616 to Chang wherein a first eccentric plate links the motor's revolving shaft and the lower arm of the yoke, and a second eccentric plate is provided opposite the first eccentric plate to neutralize vibrations during sawing.

The use of a counterbalance mechanism increase the cost of scroll or jig saw and adds significant weight to the reciprocating bearings, thereby reducing the service life of the bearings. Counterbalance mechanisms also increase the complexity of the machine, and complicate and increase the cost of repairs.

Scroll saws and jig saws also include means to attach the ends of a saw blade to the free ends of the two-armed yoke. An end of a saw blade is typically attached to the free end of an arm of the yoke by a saw blade chuck which exerts a clamping force on the blade. In many blade chuck designs, the operator must hand-tighten a set screw or nut to directly exert clamping force on the blade. U.S. Pat. No. 5,363,733 to Baird et al. provides a quick-releasing blade chuck wherein a multiple of the force applied by the operator may be indirectly applied to clamp the end of the saw blade to the yoke.

It is quite difficult to adjust the tension on the saw blade using such blade chucks. If the blade is not correctly tensioned, it may break when it encounters a workpiece. An example of a prior art releasable blade tensioning apparatus is disclosed in U.S. Pat. No. 2,721,587 to Dremel wherein a jigsaw has a pivotable blade holder attached to the end of the upper arm which can be pivoted between blade tightening and blade releasing positions. In the blade tightening position, a lever can be pivoted into position to lock the blade carrier in place with the blade under tension. However, no means are provided to readily adjust the amount of tension that is applied to the blade.

SUMMARY OF THE INVENTION

The present invention provides for a yoke or C-arm for use with a scroll saw for reciprocating motion about the work table of the scroll saw and which is constructed substantially of a composite material. The composite material C-arm of the present invention is preferably constructed substantially of a composite fiber cloth material that has been impregnated with a polymer material. The polymer material may be a temperature-cured polymer material produced from a catalyzable resin and, therefore, the C-arm may be manufactured using a conventional blow-molding process. Using the preferred blow-molding process, the interior of the composite material C-arm of the present invention is substantially hollow.

The use of lightweight composite materials to construct the C-arm of the present invention substantially reduces the weight of the C-arm relative to the weight of a comparably-sized metallic C-arm. The weight reduction substantially reduces vibrations during reciprocating motion and dispenses with the need to provide a counterbalance mechanism. The weight reduction also increases the service life of the bearings and other components that experience wear during reciprocation of the C-arm. Accordingly, the composite material C-arm of the present invention addresses the above-described deficiencies in prior art metal scroll saw C-arms.

The present invention also provides a unique means to transmit the motion of a drive link assembly operably coupled to a rotating motor shaft to reciprocate a scroll saw C-arm. As used herein, the term "drive link assembly" refers to any mechanism whereby rotational motion of a motor shaft may be converted to reciprocating motion of a structure, such as, for example, a scroll saw C-arm, that is mounted for pivoting motion about a point. The C-arm of the present invention includes a lower arm having a pinched-in drive collar attachment region for receiving a drive collar having a portion configured to snugly fit around the pinched-in drive collar attachment region. The drive collar is preferably composed of a resilient polymer material and, when forced onto the drive collar attachment region, reversibly expands and then snap-fits around the attachment region. Preferably, a pair of opposed coupling projections on the interior surface of the drive collar are provided and may nest in corresponding notches on the drive collar attachment region of the C-arm to properly position the drive collar. Flanges depending from the drive collar may be connected to the drive link assembly to transmit the motion of the drive link assembly into the reciprocating motion of the C-arm.

A similarly-constructed means is also provided for coupling the reciprocating motion of the C-arm to alternately inflate and deflate a bellows disposed adjacent the C-arm within the base of the scroll saw.

The present invention also provides a tensioning apparatus for tensioning a saw blade disposed between first and second substantially fixed attachment points. The tensioning apparatus includes a holder member for connecting the tensioning apparatus to the first attachment point and a saw blade retention member for connecting an end of the saw blade to the tensioning apparatus. The tensioning apparatus also includes a tension lever having first and second ends that is rotatably connected to the holder member at the first end to define a first rotation axis. The tension lever is also rotatably connected to the saw blade retention member, but at a position that is offset from the first rotation axis to define a second rotation axis. because of the offset between the first and second rotation axes, rotating the tension lever about the first rotation axis causes the second rotation axis to revolve around the first rotation axis.

By rotating the tension lever about the first rotation axis, the tensioning apparatus may be placed in two configurations. In a tension release configuration, the tension lever is rotated on the first rotation axis toward the second attachment point to bias the saw blade retention member toward the second attachment point. From the tension release configuration, the tensioning apparatus may be placed in a saw blade tensioning configuration by rotating the tension lever on the first rotation axis away from the second attachment point to increase the distance between the saw blade retention member and the second attachment point to tension the saw blade between the first and second attachment points.

The present tensioning apparatus may also include means to selectively and readily regulate the tension imparted when the tension lever is rotated about the first rotation axis from the tension release to the saw blade tensioning configuration. To accomplish this feature, means are provided to adjust the distance between the second rotation axis and that portion of the saw blade retention member to which a saw blade has been connected. These and other features will be apparent from the accompanying figures and the following detailed description of the invention.

BRIEF DESCRIPTION OF THE DRAWINGS

The preferred embodiment of the invention will now be described, by way of example only, with reference to the accompanying Figures wherein like members bear like reference numerals and wherein.

DETAILED DESCRIPTION OF AN EMBODIMENT OF THE INVENTION

Figure 1:
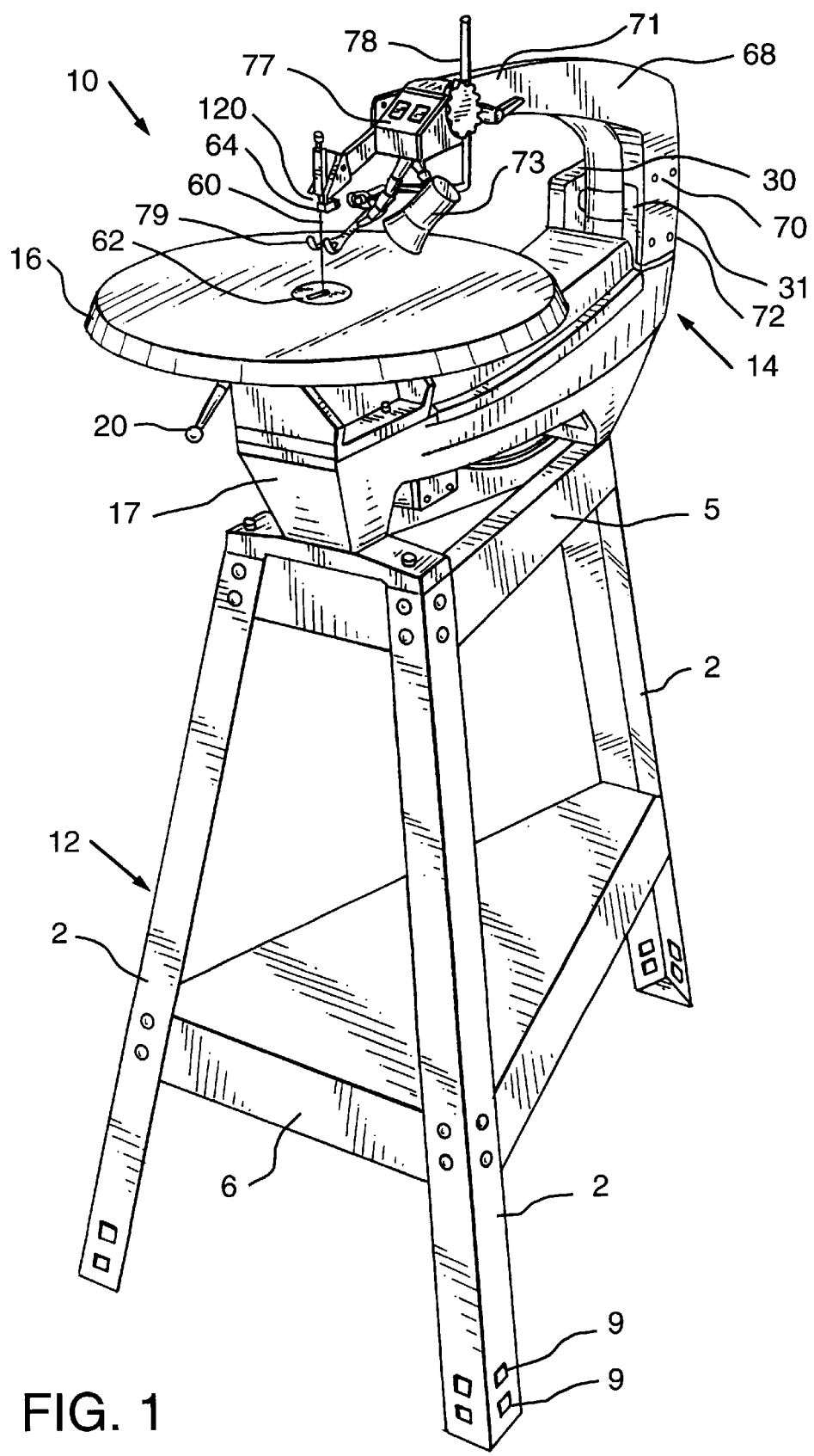
FIG. 1 is a perspective view from the right and from above of an embodiment of the scroll saw of the present invention.
Figure 2:
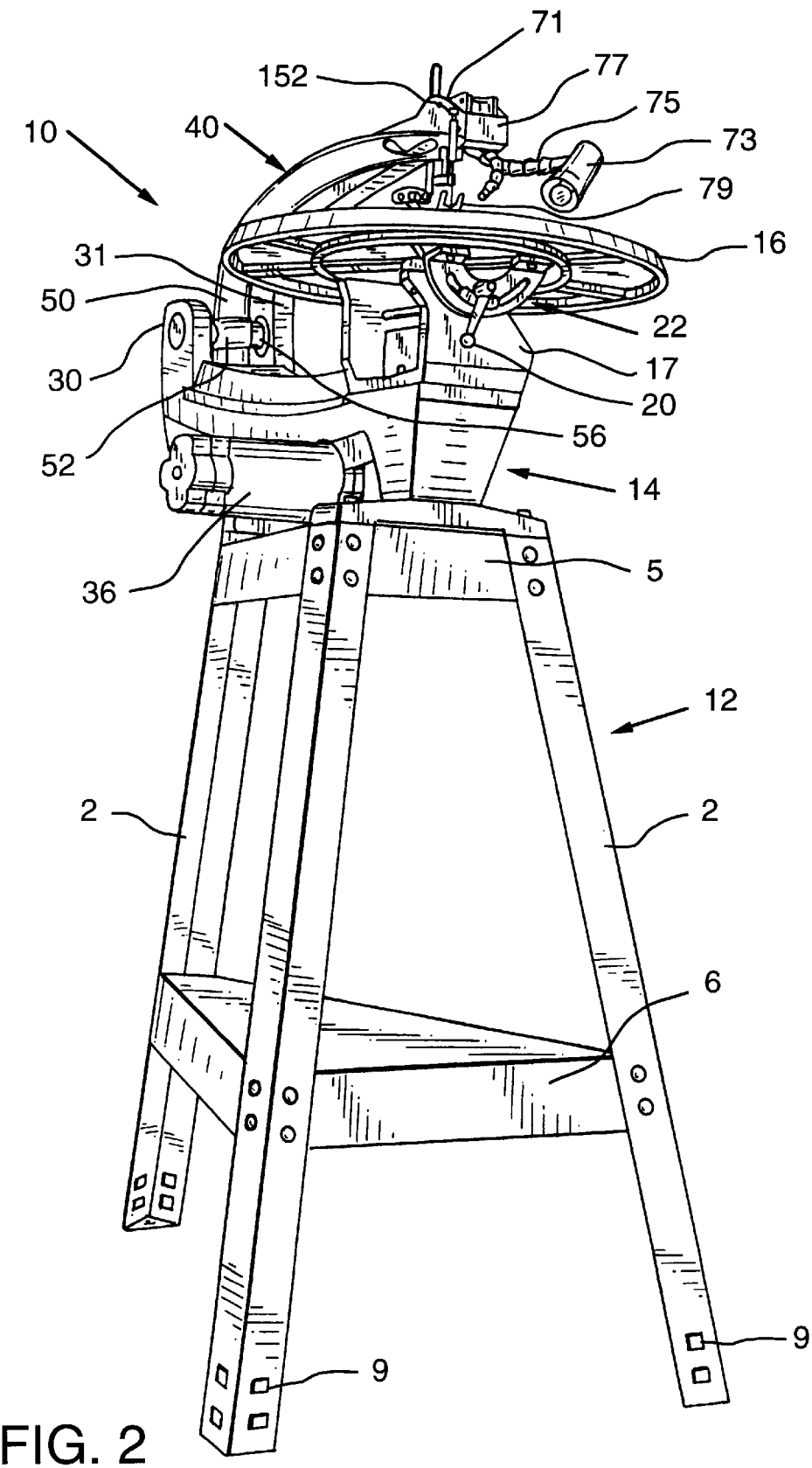
FIG. 2 is a perspective view from the left and from below the scroll saw of FIG. 1.
Figure 3:
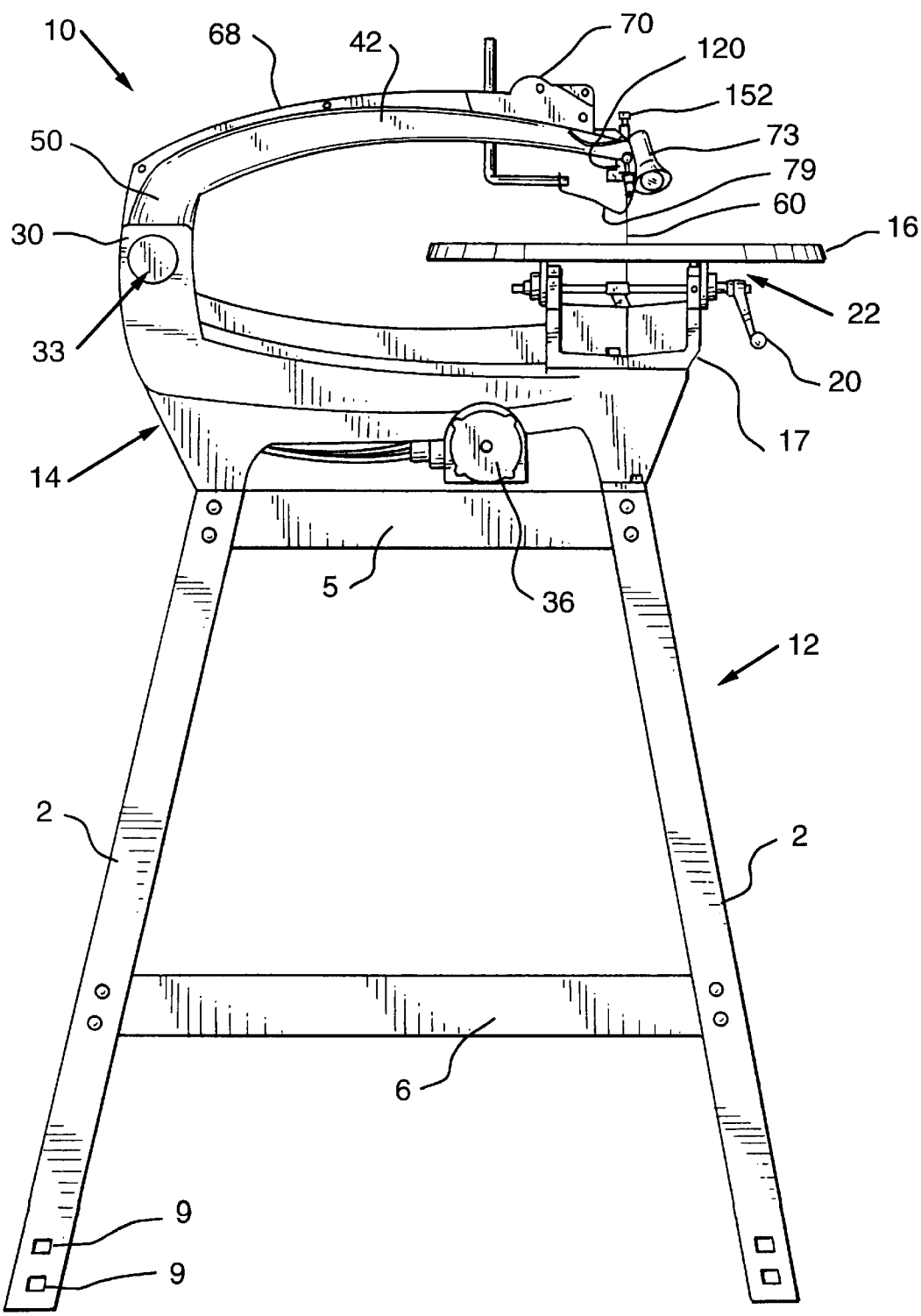
FIG. 3 is a left side elevational view of the scroll saw of FIG. 1.
Figure 4:
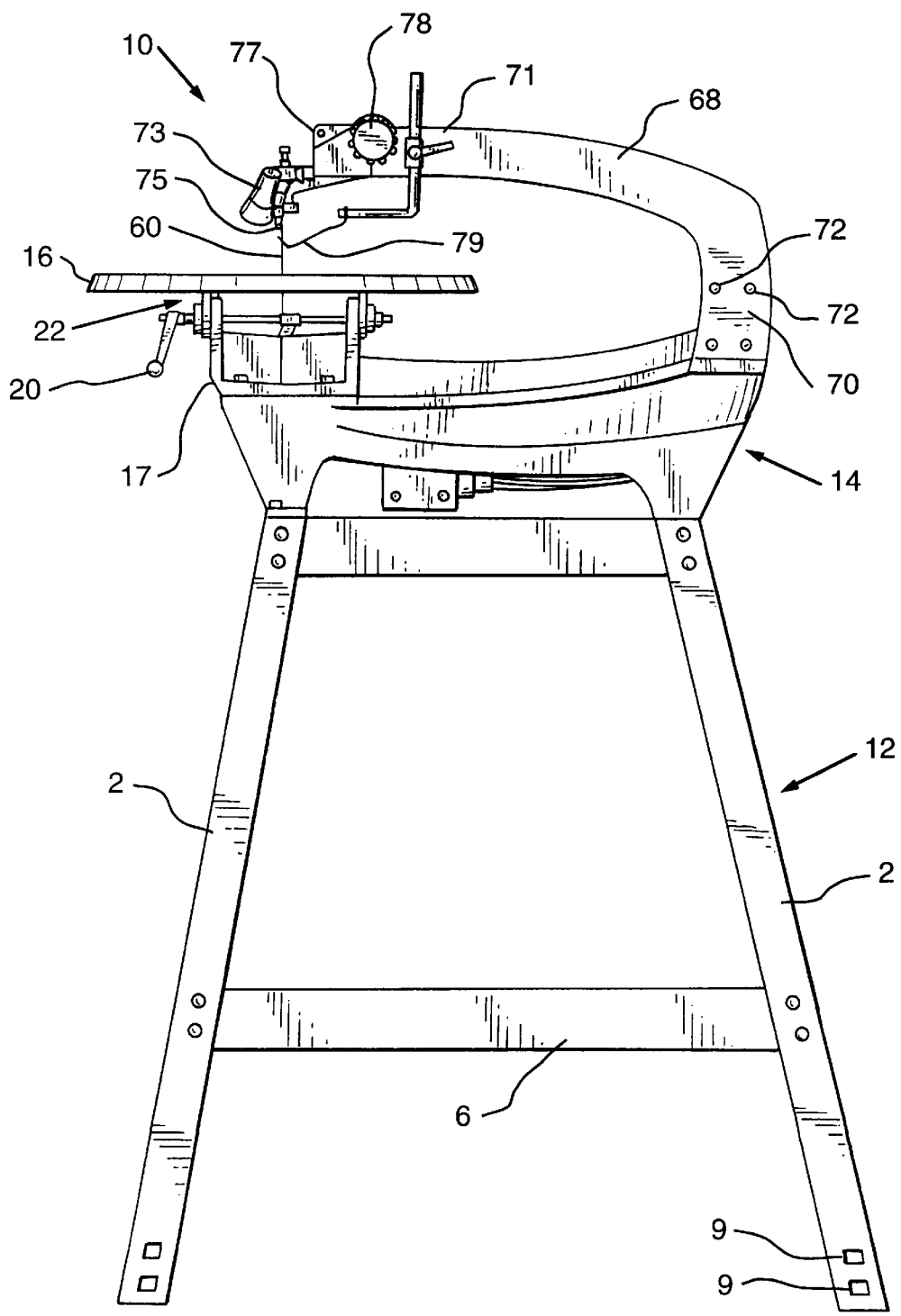
FIG. 4 is a right side elevational view of the scroll saw of FIG. 1.

Referring now to the drawings, which are for the purpose of illustrating the preferred embodiment of the invention and not for the purpose of limiting the same, FIGS. 1–4 show a scroll saw 10 of the present invention having a stand 12 on which is mounted a base 14. The scroll saw is also generally depicted in co-pending U.S. Pat. No. Des. 373,129, the entire disclosure of which is hereby incorporated by reference. A circular table 16 for supporting a workpiece is adjustably mounted on base 14 by table support 17. The orientation of table 10 is preferably adjustable and, as depicted, table 10 may be adjusted by loosening handle 20 to thereby release trunion assembly 22 and allow table 10 to be tilted on an axis generally along the longitudinal axis of base 10.

Figure 8:
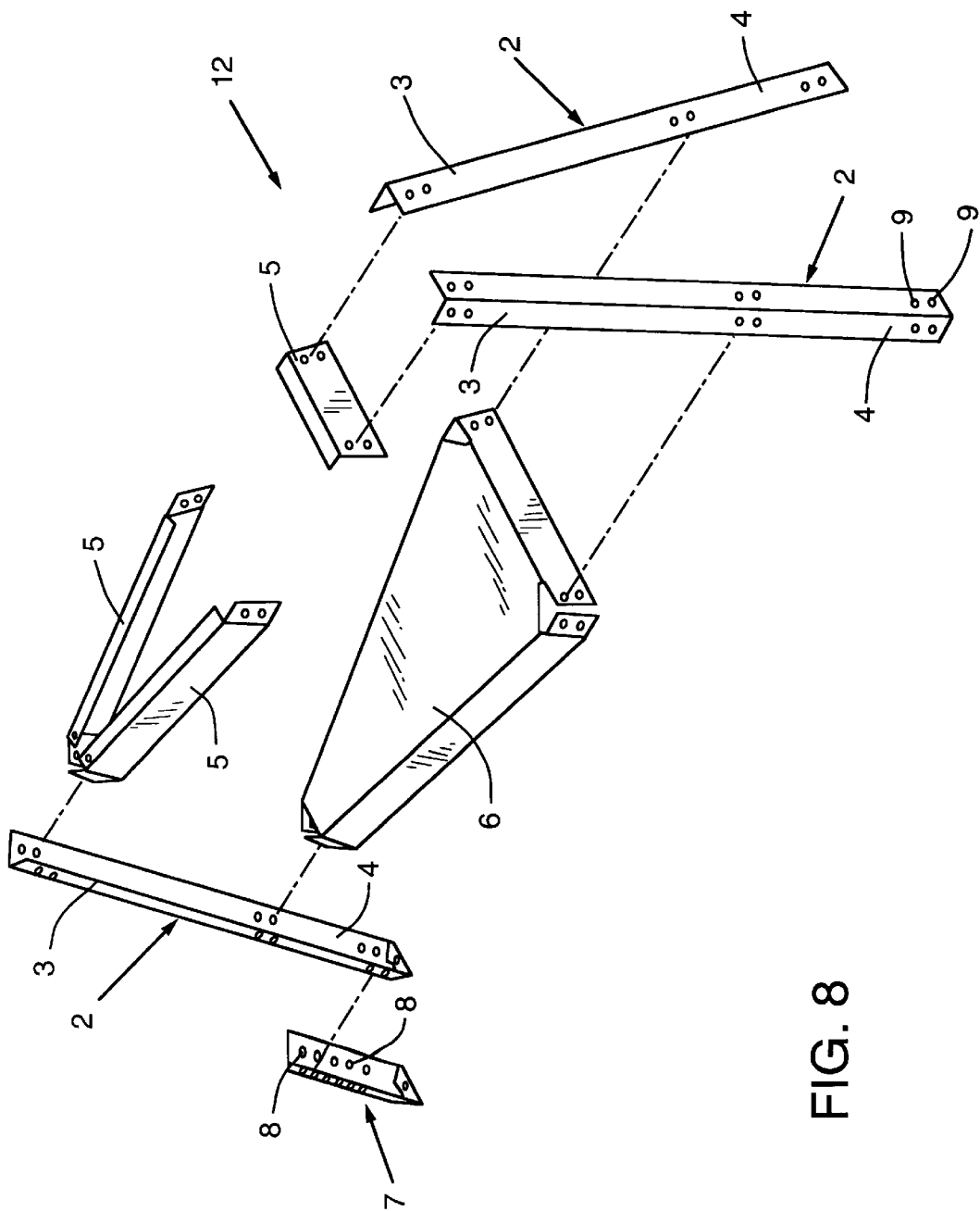
FIG. 8 is an assembly view of the stand of an embodiment of the scroll saw of the present invention.

Referring to FIG. 8, stand 12 preferably includes three longate leg members 2 having a generally L-shaped cross-section and having first ends 3 and opposed second ends 4. First ends 3 are fixedly connected to braces 5 and second ends 4 are fixedly connected to the corners of triangular shelf 6 to provide a three-sided stand 12 having a shape best illustrated in FIGS. 1 and 2. Preferably, stand 12 further includes leg extension member 7 having a generally L-shaped cross section that corresponds to that of leg members 4. Leg extension member 7 includes multiple bores 8 on two surfaces thereof and may be fixedly attached to the free end of any of leg members 2.

As best shown in FIG. 1, the terminus of second end 4 of each leg member 2 includes two bores 9 on each surface thereof. To attach leg extension member 7 to the free end of any leg member 2, two of bores 8 are aligned with bores 9 and fasteners are disposed through the aligned bores. Because leg extension member 7 includes multiple bores 8, the relative extension of a particular leg member 2 provided by attaching leg extension member 8 thereto may be chosen by selectively aligning two particular adjacent bores 8 with bores 9 of the chosen leg member 2. Appropriate placement of leg extension member 7 provides a convenient means to tilt work table 16 toward an operator and allows a seated operator to comfortably view the workpiece.

Figure 7:
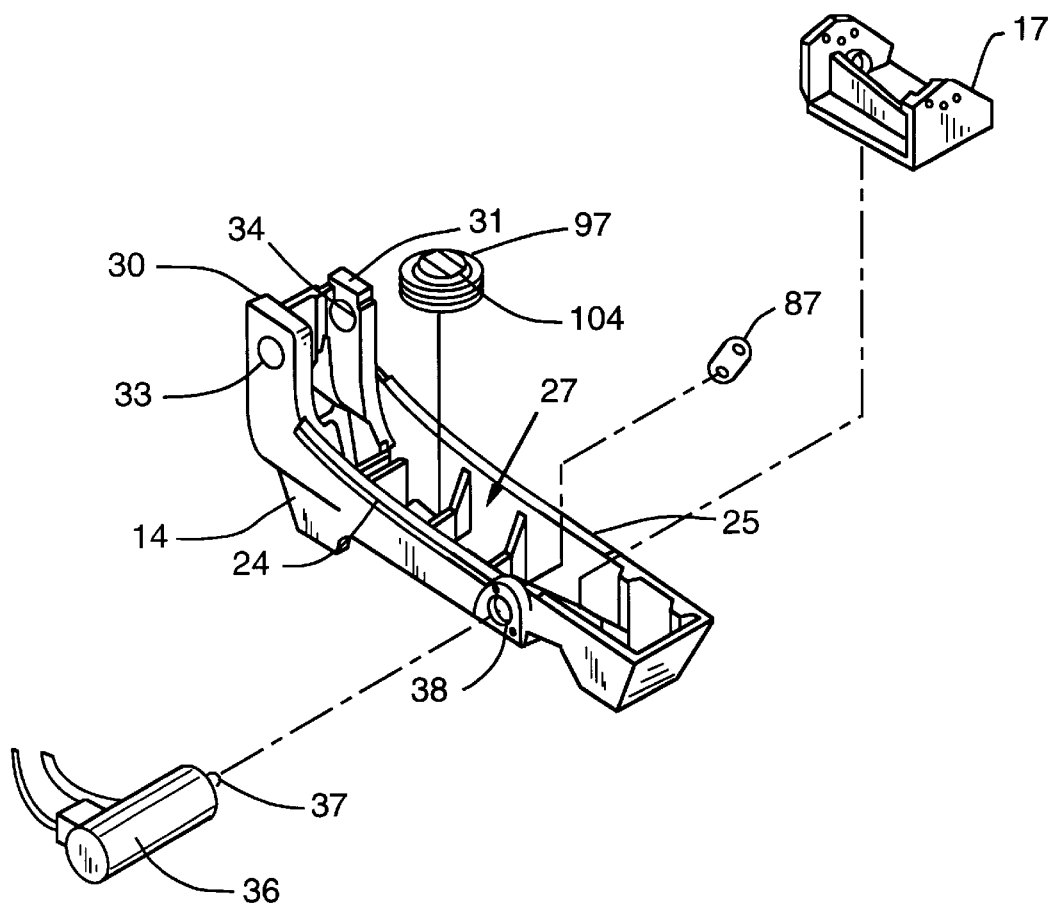
FIG. 7 is an assembly view of the elements associated with the base member of an embodiment of the scroll saw of the present invention.

As best shown in FIG. 7, base 14 of scroll saw 10 includes opposed side wall extensions 24 and 25 that define between them an elongated well 27. At an end of base 14 opposite from the attachment of table support 17, side wall extensions 24 and 25 project upward and define a pair of substantially vertical bearing supports columns 30 and 31 having opposed and co-axial bearing support bores 33 and 34 therethrough. Motor 36 is connected to base 14 so that the shaft 37 of motor 36 is disposed through shaft bore 38 and within elongated well 27.

Figure 5:
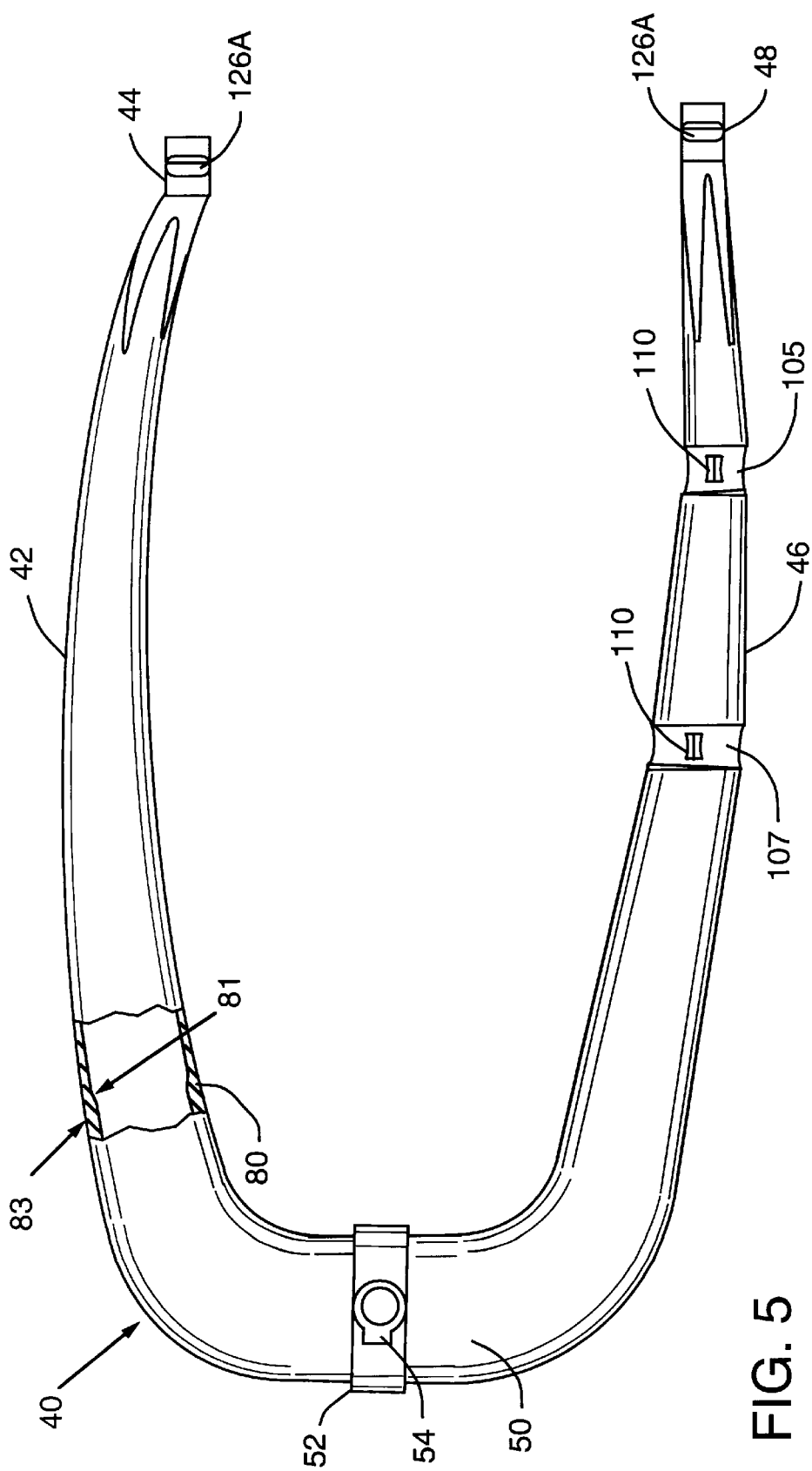
FIG. 5 is an elevational, partial cut-away view of an embodiment of the C-arm of the scroll saw of the present invention.
Figure 9:
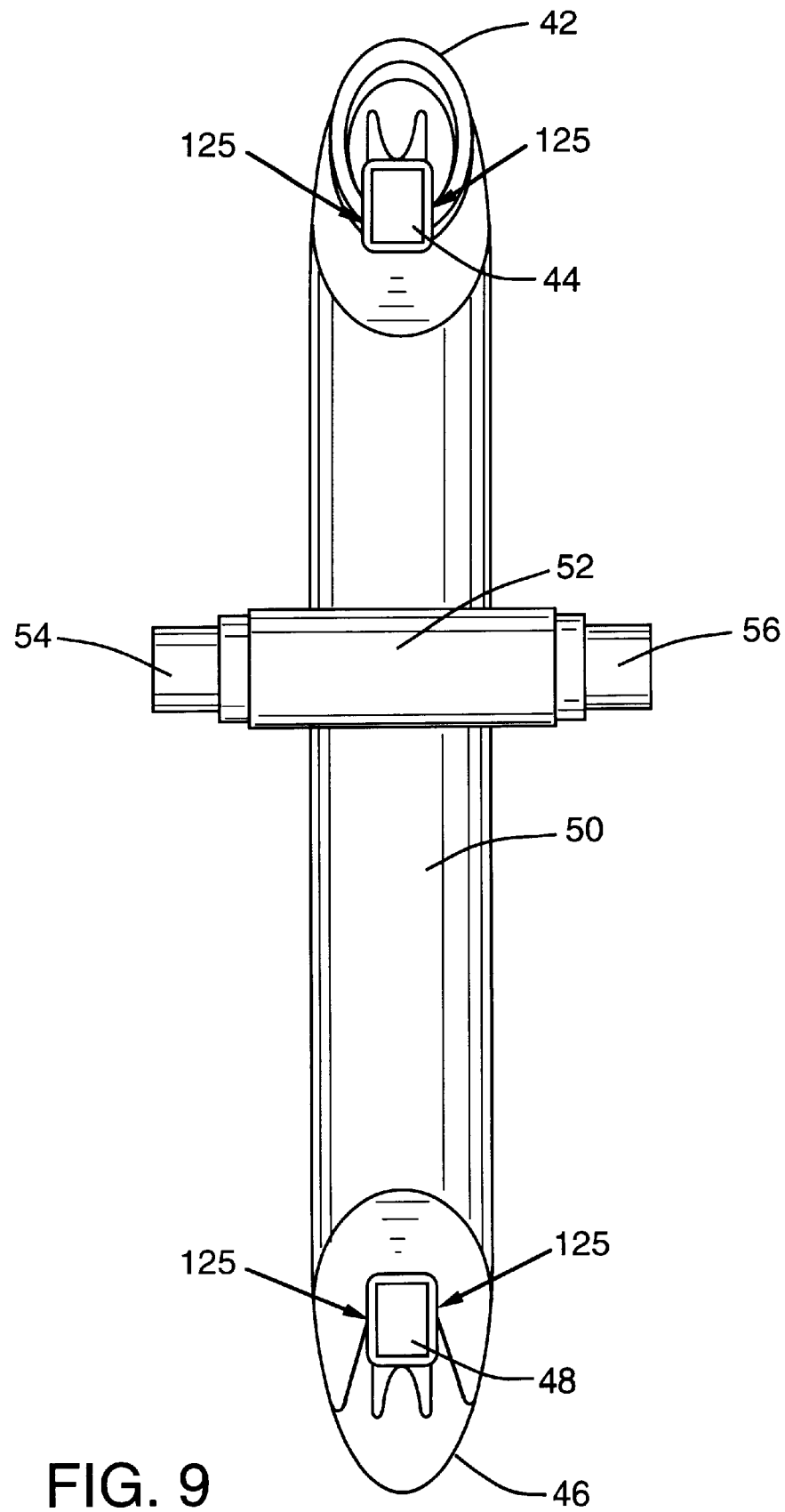
FIG. 9 is a front-on, elevational view of the C-arm of an embodiment of the scroll saw of the present invention showing the C-arm in isolation.

Scroll saw 10 further includes a two-armed generally C-shaped or U-shaped member yoke, referred to herein as C-arm 40 and shown or in isolation in FIGS. 5 and 9, having an upper arm 42 terminating in upper end 44 and a lower arm 46 terminating in lower end 48. It is preferred that the upper arm 42 and lower arm 46 are slightly curved rather than straight to augment the strength of the arms and to provide extra clearance to allow an operator to reach around behind the saw blade to handle workpieces. A curved bight 50 connects the upper arm 42 and the lower arm 46 and includes a pivot bracket 52 having opposed, co-axial pivot axis projections 54 and 56 extending substantially perpendicular to the plane defined by upper and lower arms 42 and 46. Preferably, the cross-sections of the upper arm 42, lower arm 46 and bight 50 are generally elliptical. The C-arm 40 is pivotally connected to base 14 by disposing pivot axis projections 54 and 55 within bearing members (not shown) that are resident in bearing support bores 32 and 34. Curved bight 50 of C-arm 40 is thereby positioned between bearing support columns 30 and 31 such that lower arm 46 is disposed within elongated well 27, upper arm 42 is positioned above table 16, and C-arm 40 may reciprocate freely about the substantially horizontal axis defined by pivot axis projections 54 and 56.

As indicated in FIGS. 1–4, a saw blade 60 is releasibly connected by any known means between the upper end 44 and the lower end 48 of C-arm 40 so as to pass through saw blade bore 62 in table 16. As discussed in greater detail below, a preferred means for attaching saw blade 60 to the upper and lower ends 44 and 48, respectively, of C-arm 40 is the quick release saw blade chuck described and claimed in U.S. Pat. No. 5,363,733. A commercial embodiment of that patented saw blade chuck has been incorporated into the accompanying Figures.

Referring again to FIGS. 1–4, scroll saw 10 includes stationary arm 68 fixedly connected at a first end 70 to an outer surface of bearing support column 30, 31 by fasteners 72 and terminating in a second end 71 in the vicinity of the upper end 44 of C-arm 40. Second end 71 of stationary arm 68 provides a convenient region of attachment for any elements that either must be disposed adjacent the workpiece or should be within convenient reach of an operator. Such elements incorporated on second end 71 include, for example, light assembly 73, air nozzle 75, motor control box 77, motor speed adjustment knob 78 and work hold down 79. The shape of stationary arm 68 generally tracks the curved shape of upper arm 42 and, therefore, serves the auxiliary function of partially shielding an operator from the reciprocating motion of the C-arm 40 during operation.

According to the present invention, C-arm 40 is constructed of a light weight, composite material and, as shown by the cut-away of FIG. 5, is preferably constructed of walls 80 defined by inner wall 81 and outer wall 83 and is hollow throughout its entire length. A composite material is that constructed of a matrix material reinforced by a fibrous material. The composite material used to produce the composite material C-arm 40 of the present invention preferably comprises a composite fiber cloth impregnated in a matrix of a temperature-cured resin-derived polymer. More preferably, the composite material is a carbon fiber cloth impregnated in a cured epoxy resin. The composite material C-arm 40 of the present invention is preferably produced by a conventional blow-mold manufacturing process known to those of ordinary skill in the manufacturing art. Such a process is typically used to manufacture familiar items such as, for example, tennis rackets. Accordingly, one of ordinary skill advised of the shape and the intended function of the finished product could produce the product by a conventional blow molding process without undue experimentation. To provide mechanical properties for suitable functioning of the C-arm when the scroll saw is in operation, in a preferred configuration the C-arm 40 does not exceed 575 grams in weight, has a maximum deflection, measured between upper and lower ends 44 and 48, of 0.20" when deflected at 25 pounds, and has a center of gravity approximately 4.75" measured from the center of pivot bracket 52 in the general direction of the upper and lower ends 44 and 48. For the convenience of the reader unskilled in the manufacturing art, a generalized description of the blow-molding process used to produced the preferred composite-material C-arm follows.

In a first step of the procedure, epoxy resin-impregnated carbon composite fiber cloth is wrapped around a tubular polyethylene bag. The size and thickness of the fiber cloth pieces are chosen to satisfy the desired mechanical specifications and the desired shape for the finished product. To produce the preferred configuration of the C-arm, 45% resin and 55% fiber (by weight) is used. In a second step, the assembled resin-impregnated cloth/polyethylene bag assembly is laid into a two-piece mold that defines the outer dimensions of the finished C-arm 40. Pivot bracket 52, preferably constructed of die cast aluminum, is threaded over the cloth/bag assembly and is precisely positioned by locating pins in the mold halves. In a third step, appropriate heat is applied to the mold and air pressure is introduced into the polyethylene bag. The pressurized polyethylene bag expands and forces the resin-impregnated cloth to flow and press against the interior contour of the mold cavity. The applied heat is at a temperature that will liquify the resin and initiate a polymerization reaction to harden the resin and cause the saturated composite cloth to retain the shape of the interior contour of the mold. In a preferred procedure, the mold temperature was 150° C., the air pressure was 8–10 kilograms, and the cure time at the mold temperature was 50 minutes. The mold is then cooled and disassembled to release the C-arm, which is then cured out of the mold for an additional 10 minutes at a temperature of 80° C.

During manufacturing, pivot bracket 52 becomes molded into the polymerized resin and is fixedly connected to the C-arm 40 at bight 50. To enhance appearance, the cured C-arm 40 may then be subjected to post-molding procedures such as puttying, sanding and painting. The inventors have found that a hollow, composite material C-arm 40 manufactured by the foregoing known blow-molding procedures has a weight of about one-third that of a convention-ally-produced metal C-arm. For example, a three-pound metal C-arm of a typical 18" scroll saw may be replaced by a one-pound composite material C-arm.

The significantly reduced weight of the composite C-arm 40 allows the scroll saw 10 to operate with very little vibration compared with a scroll saw having a metal C-arm of generally the same size. Accordingly, the composite C-arm scroll saw of the present invention need not include a counterbalance mechanism. the significant weight reduction afforded by the composite C-arm 40 of the present invention also significantly reduces the load on the pivot bracket 52 and on the bearings on which the pivot bracket 52 reciprocates, thereby increasing the service life of both the pivot bracket 52 and the bearings relative to a like machine incorporating a heavier metallic C-arm.

As shown in the cut-away portion of FIG. 5, it is referred that composite C-arm 40 have a wall 80 of greater thickness (distance between inner wall 81 and outer wall 83) along the curved bight 50 than along the upper and lower arms 42 and 46. In a preferred embodiment, the thickness of wall 80 is 0.157 inches in the curved bight region and abruptly tapers to a lesser, relatively constant thickness in the upper and lower arm regions. The augmented thickness of wall 80 in the bight region strengthens the C-arm 40 in the vicinity of the pivot bracket 52 to better withstand the forces transmitted through pivot bracket 52 to the C-arm 40. The bight region's augmented thickness also centers the weight of the C-arm 40 toward the bight 50 and this further inhibits vibration.

Figure 6:
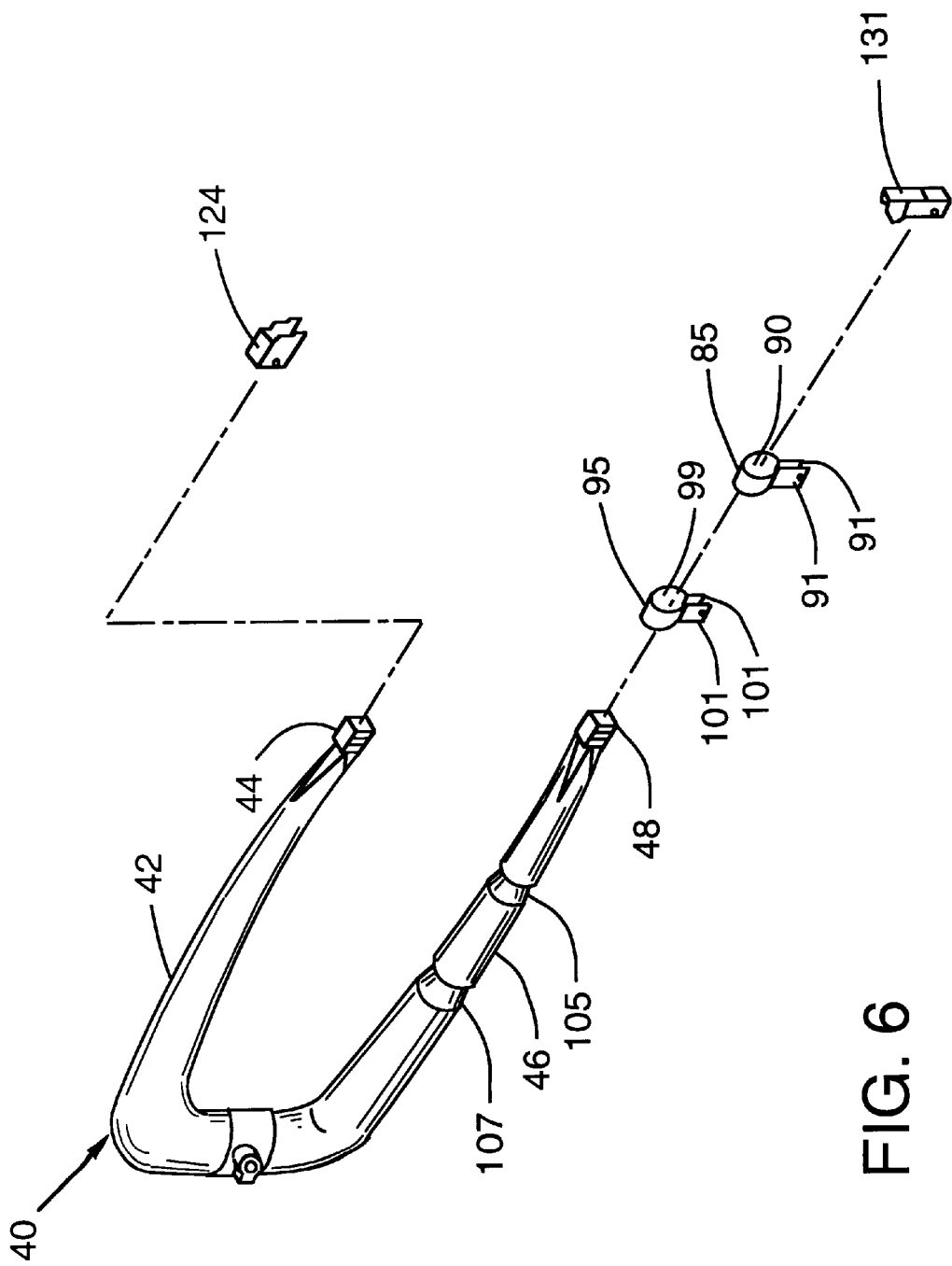
FIG. 6 is an assembly view of elements associated with the C-arm of an embodiment of the scroll saw of the present invention.
Figure 19:
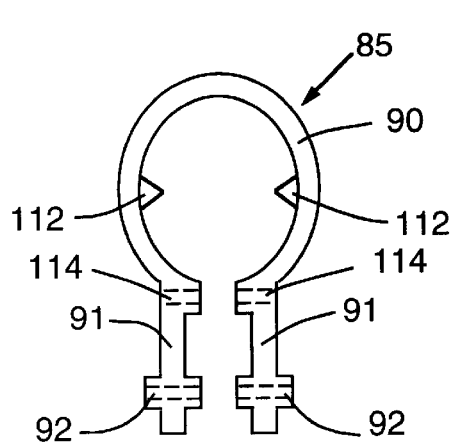
FIG. 19 is a view in profile of an embodiment of the drive collar of the present invention.

Referring to FIGS. 6 and 7, C-arm 40 is operably connected to the shaft of motor 36 within elongated well 27 by drive collar 85, shown in profile in FIG. 19. Drive collar 85 is generally U-shaped and includes arcuate connector portion 90 having two dependent opposed flanges 91 projecting therefrom. An end of drive link assembly 87 is fixedly connected to motor shaft 37 and another end of drive link assembly 87 is rotatably connected between flanges 91 of drive collar 85 by interposing an opposite end of drive link assembly between flanges 91 and securing a fastener through bores 92. In this way, the rotation of the drive shaft is eccentrically transmitted to C-arm 40 to thereby reciprocate C-arm 40 about its pivot point at pivot bracket 52.

Figure 20:
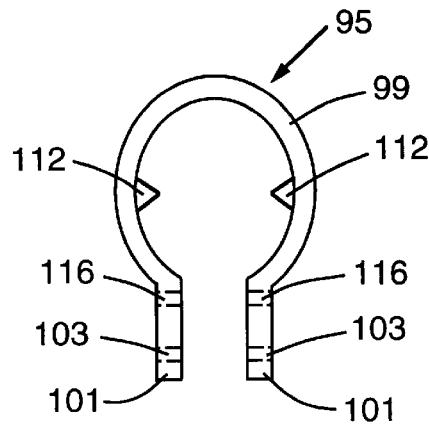
FIG. 20 is a view in profile of an embodiment of the bellows collar of the present invention.

A bellows collar 95, shown in profile in FIG. 20, is also preferably provided for coupling the reciprocating motion of C-arm 40 to bellows 97, which, as indicated in FIG. 7, is fixedly disposed on the bottom inner surface of the elongated well 27 of base 14. Bellows collar 95 includes an arcuate connector portion 99 having two opposed flanges 101 dependent therefrom. A bellows projection 104 on the top surface of bellows 97 is fixedly disposed between dependent flanges 101 by securing a fastener through opposed bores 103. The reciprocating motion of C-arm 40 correspondingly deflates and inflates bellow 97. An air hose (not shown) communicates bellows 97 with air nozzle 75.

Figure 21:
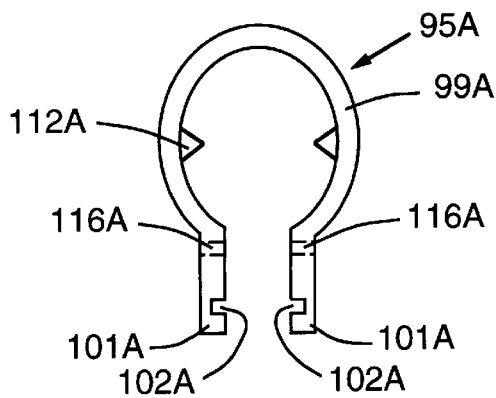
FIG. 21 is a view in profile of an alternate embodiment of the bellows collar of FIG. 20.

An alternate arrangement for coupling bellows collar 95 to bellows 97 is to configure bellows 97 to include on its top surface a projection having a raised rim thereon (not shown). the corresponding alternate construction of bellows collar 95 is shown as 95A in FIG. 21. Instead of including opposed bores 103, flanges 101A of bellows collar 95 terminate in opposed channels 102A. Channels 102A may be seated around the raised rim of the bellow's projection when opposed flanges 101A are urged together by a fastener disposed through bores 116A to retain bellows collar 95A around bellows collar attachment region 107. This alternate embodiment for the bellows collar would not require the use of an additional fastener to couple the bellows collar 95 to bellows 97.

Figure 10:
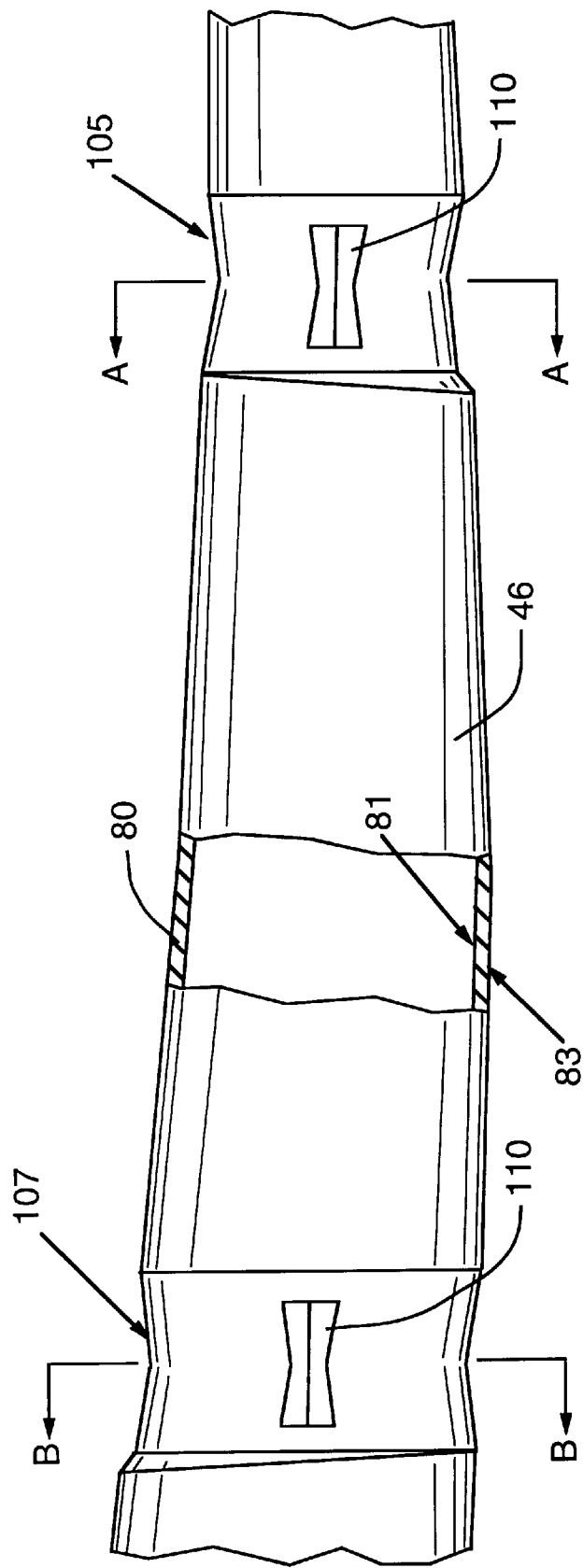
FIG. 10 is a plan view of the bellows collar and drive collar attachment regions of the C-arm of a preferred embodiment of the scroll saw of the present invention.
Figure 11:
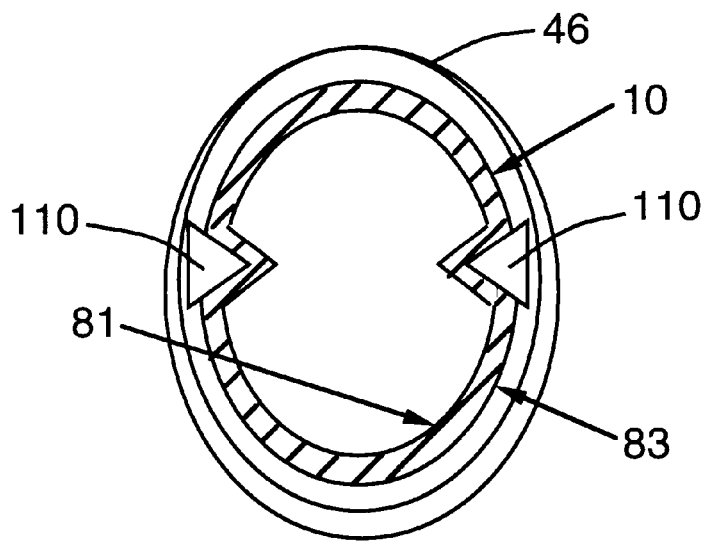
FIG. 11 is a cross-sectional view through the bellows collar attachment region of FIG. 10.
Figure 12:
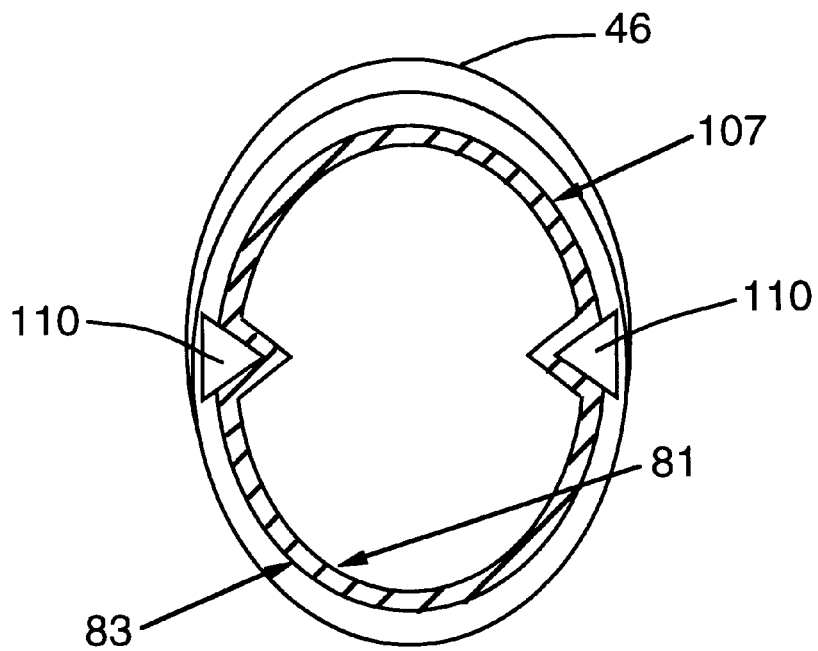
FIG. 12 is a cross-sectional view through the drive collar attachment region of FIG. 10.

Drive collar 85 and bellows collar 95, respectively, are both preferably configured so they will snap-fit onto correspondingly-shaped drive collar attachment region 105 and bellows collar attachment region 107 of lower arm 46, shown in FIG. 5. FIG. 10 depicts in isolation the preferred design of the portion of lower arm 46 including drive collar attachment region 105 and bellows collar attachment region 107. The walls 80 of C-arm 40 are pinched in (i.e., have a smaller cross-sectional area) at attachment regions 105 and 107 and the opposed sides of each attachment region 105 and 107 include a generally rectangular-shaped notch 110. These contours are readily provided by appropriately shaping the interior contour of the mold used to produce the composite C-arm 40. To better describe the shape of drive collar attachment region 105, FIG. 11 is a cross-section generally along line A—A of FIG. 10. FIG. 12 is a cross-section through bellows collar attachment region 107 generally along line B—B of FIG. 10. Both FIGS. 11 and 12 are cross-sections looking in the direction of curved bight 50 of C-arm 40 and both cross-sections illustrate notches 110 and the reduced cross-sectional area of the two attachment regions relative to the adjacent portions of the lower arm 46.

Figure 13:
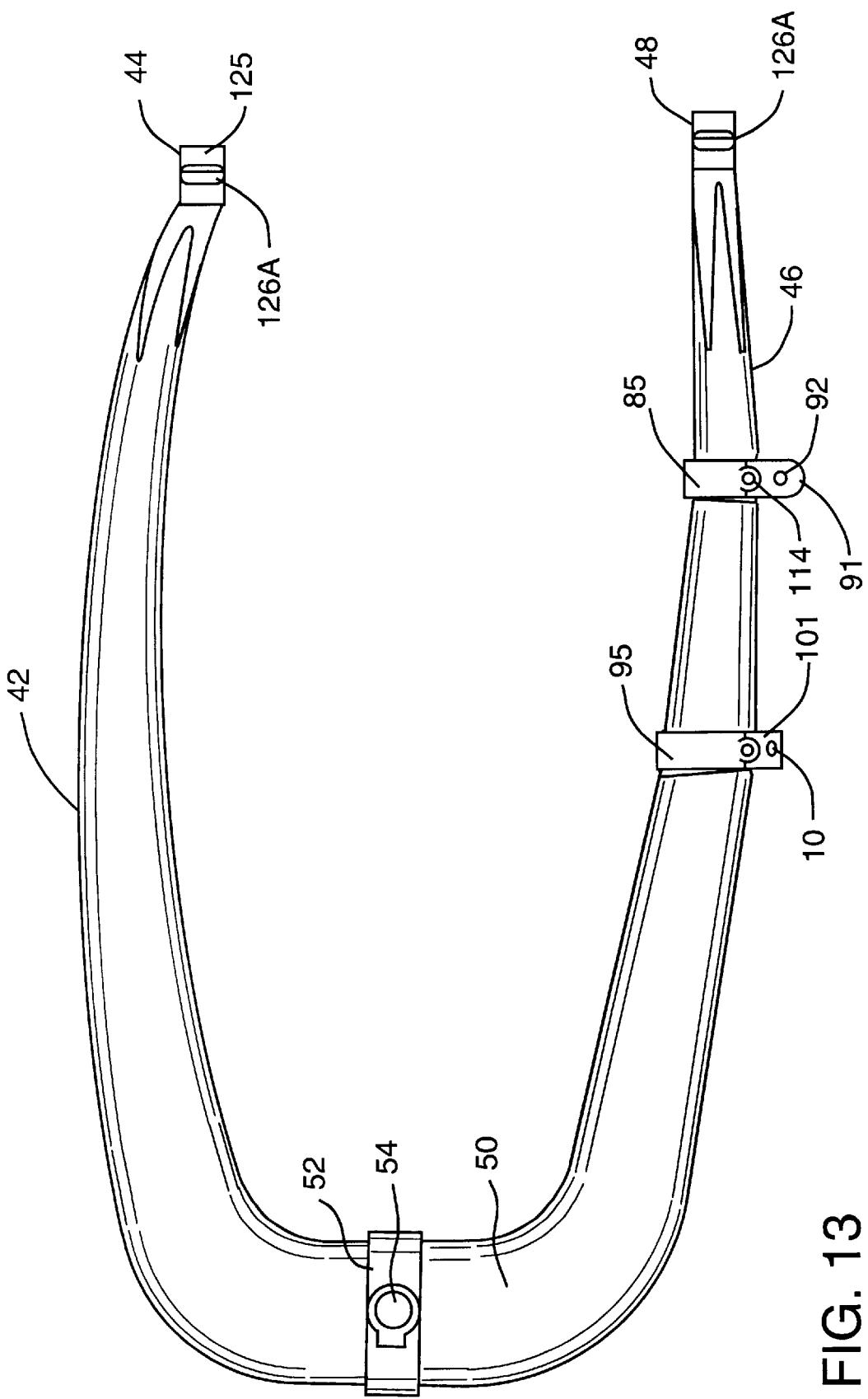
FIG. 13 is an elevational, partially cut-away view of the C-arm of an embodiment of the scroll saw of the present invention showing the drive collar and bellows collar in place.

Collars 85 and 95 are preferably manufactured of a resilient material, preferably a plastic material, and the internal perimeters of arcuate connector portions 90 and 99 closely match the outer surface of the corresponding attachment regions 105 and 107. So that drive collar 85 and bellows collar 95 snap-fit onto their corresponding attachment regions 105 and 107, respectively, each collar 85 and 95 preferably includes on the inner surface of arcuate connector portions 90 and 91, respectively, opposed raised coupling projections 112 sized and positioned so as to nest within notches 110 on attachment regions 105 and 107 when collars 85 and 95 are properly positioned on lower arm 46. Accordingly, collars 85 and 95 may be forced onto corresponding attachment regions 105 and 107, respectively, and coupling projections 112 will snap-fit into the corresponding notches 110 and retain the collars 85 and 95 in their proper orientations as shown in FIG. 13.

Referring again to FIG. 19, drive collar 85 is retained in position around drive collar attachment region 105 of lower arm 46 by disposing a fastener through opposed retention bores 114 and drawing flanges 91 together to draw the inner surface of arcuate connector portion 90 tightly around the outer surface of the drive collar attachment region 105. Likewise, referring to FIG. 20, bellows collar 95 is retained in position around bellows collar attachment region 107 of lower arm 46 by disposing a fastener through opposed retention bores 116 and drawing flanges 101 together to draw the inner surface of arcuate connector portion 99 tightly around the outer surface of the drive collar attachment region 105.

Manufacturing drive collar 85 and bellows collar 95 from a plastic material, rather than a tougher material such as, for example aluminum or steel, reduces the cost of the collars 85 and 95 and also reduces wear of the outer surface of the C-arm 40 that may occur through friction between the collars 85 and 95 and the C-arm 40 during reciprocating motion. The snap-fit arrangement of the collars 85 and 95 on C-arm 40 also allows quick and easy repair and replacement of the collars. Although the arrangement of the present invention wherein a specially-shaped drive collar and bellows collar snap-fit onto correspondingly-shaped regions on an arm of a C-arm has been described in connection with the composite material C-arm of the present invention, it is to be understood that it is not necessary to use the composite material C-arm and a C-arm constructed of any alternate material could also be used. For example, a conventional metal C-arm may be provided having the invention's specially-shaped drive collar and bellows collar attachment regions.

The present invention also provides for a tensioning apparatus for tensioning and adjusting the tension on a saw blade disposed between the free ends of the scroll or jig saw's C-shaped or U-shaped yoke. Although the tensioning apparatus is described herein in conjunction with the composite material C-arm scroll saw of the present invention, it is to be understood that the tensioning apparatus described herein may be incorporated on any scroll or jig saw with like effect.

Figure 14:
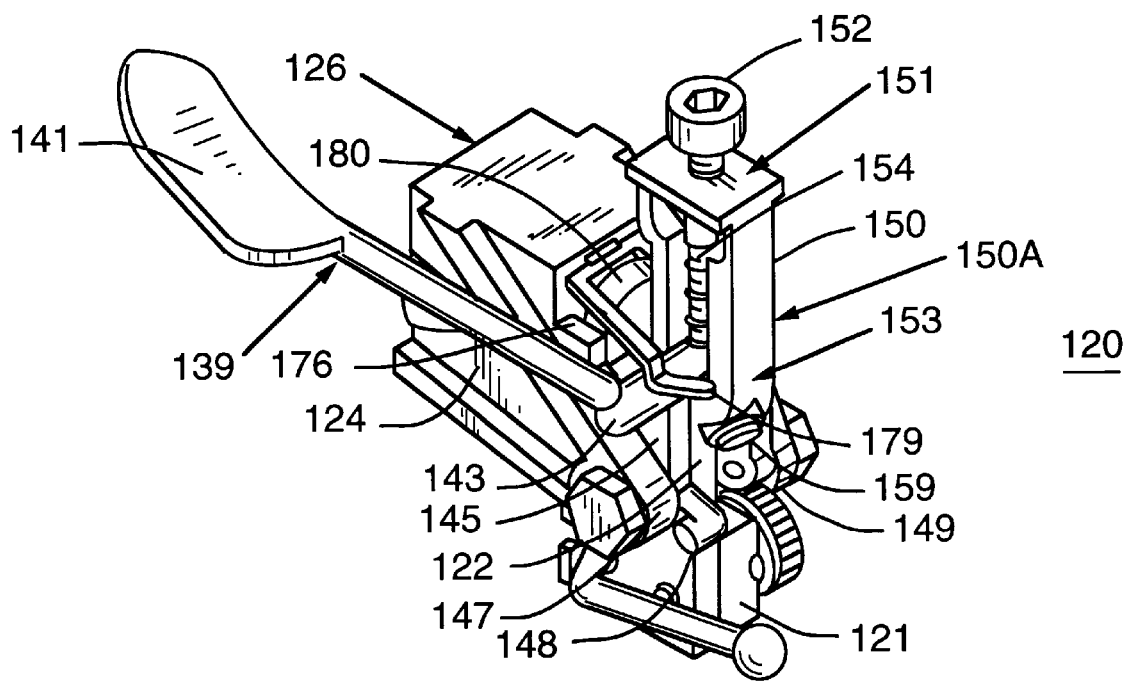
FIG. 14 is a perspective view in isolation of an embodiment of the saw blade tensioning apparatus of the present invention.
Figure 15:
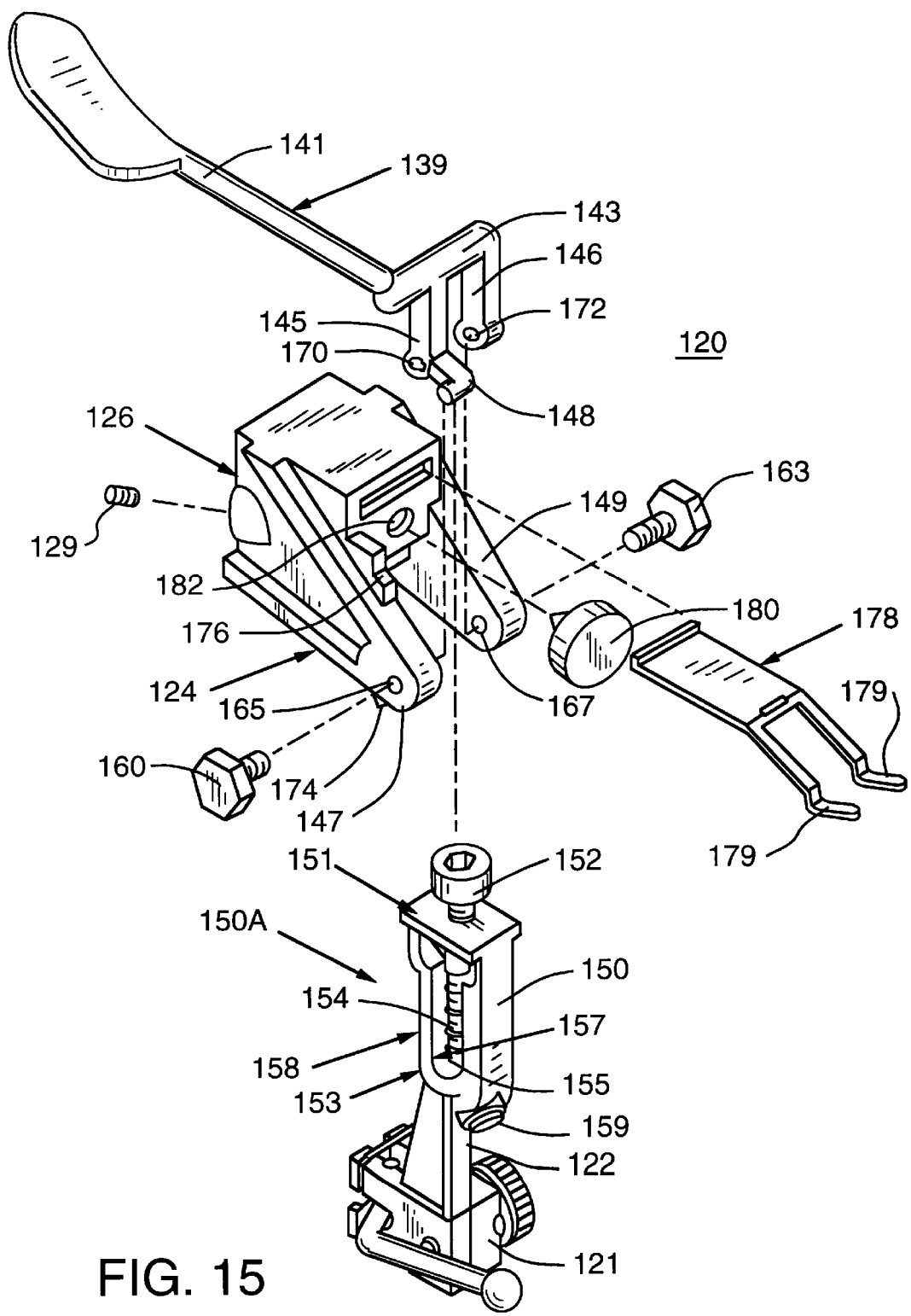
FIG. 15 is an assembly view of the saw blade tensioning apparatus depicted in FIG. 14.
Figure 17:
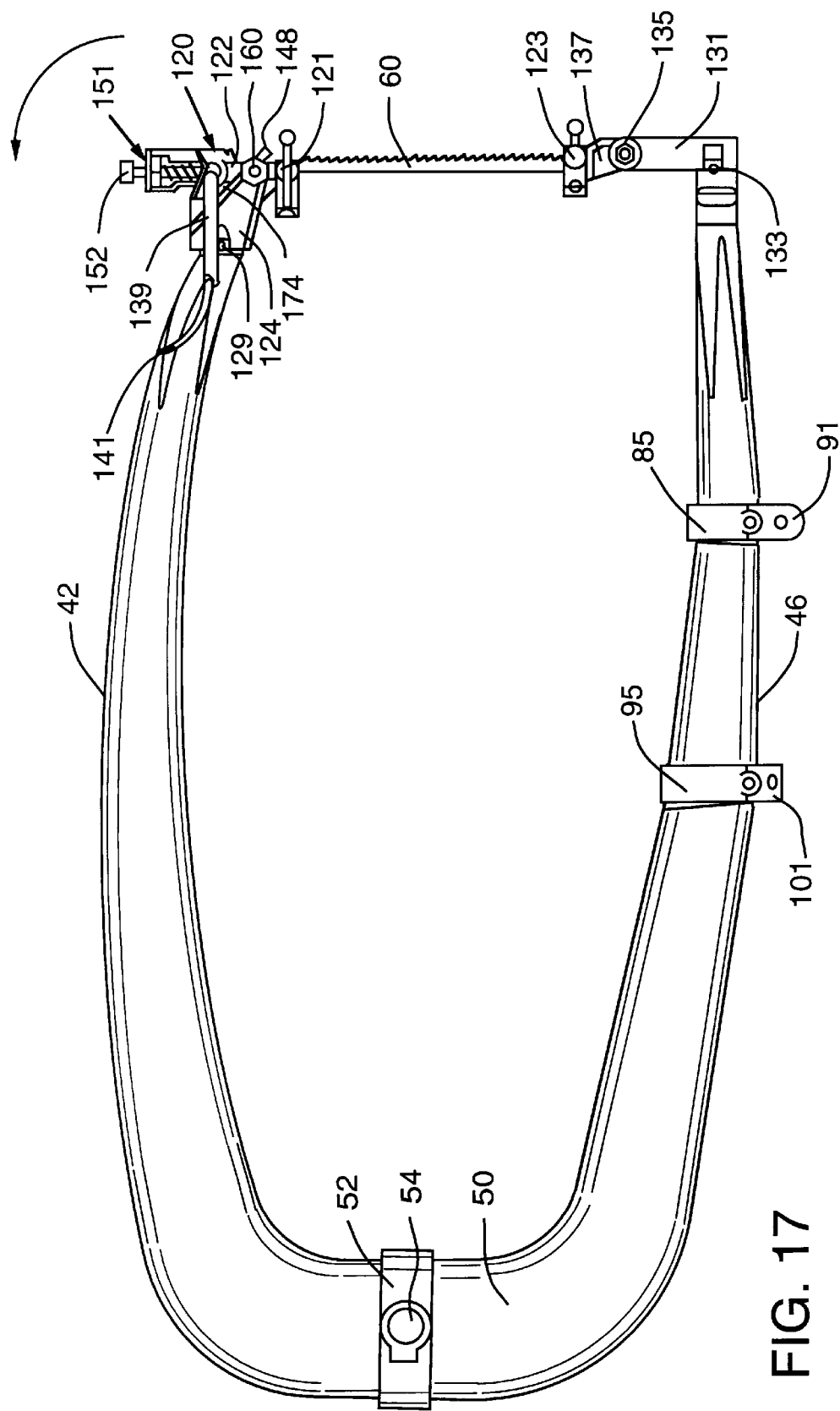
FIG. 17 is an elevational view of the C-arm of the scroll saw of an embodiment of the present invention with the saw blade tensioning apparatus of FIG. 14 attached thereto and in the blade tensioning orientation.

A preferred design for the tensioning apparatus of the present invention is illustrated as 120 in a perspective view in FIG. 14 and in an assembly view in FIG. 15. With respect to the scroll saw 10 of the present invention, and as shown in FIG. 17, tensioning apparatus 120 is fixedly disposed on upper end 44 of the upper arm 42 of C-arm 40. Tensioning apparatus 120 includes a saw blade attachment member for connecting an end of a saw blade to the tensioning apparatus. Preferably, the saw blade attachment member is a quick release saw blade chuck 121, connected to the other elements of the tensioning apparatus 120 by support 122, so that a free end of elongate saw blade 60 may be conveniently releasibly attached to upper arm 42. Again referring to FIG. 17, the other free end of saw blade 60 is preferably releasibly retained by a quick release blade chuck 123 to lower arm 46. Although the quick release blade chucks of U.S. Pat. No. 5,363,733 are preferred, it is understood that any known means for connecting an end of a saw blade to a scroll saw or jig saw yoke, including set screws, may be used.

Figure 18:
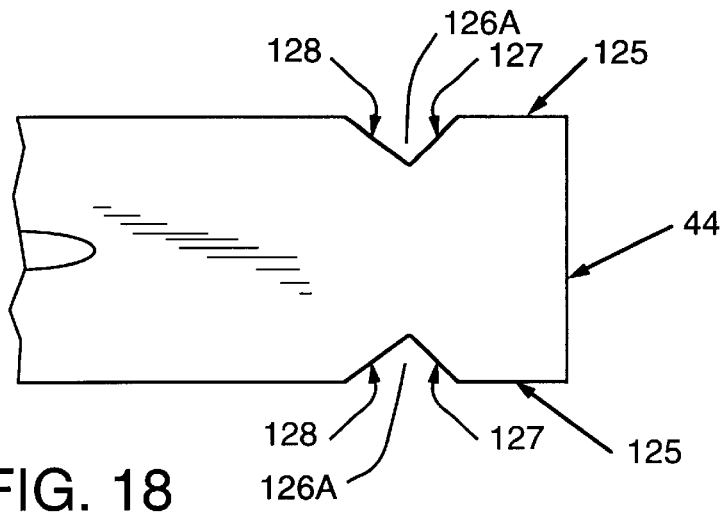
FIG. 18 is a top view showing in isolation an end of one arm of the C-arm of the scroll saw of the present invention.

Referring again to FIGS. 14 and 15, to dispose tensioning apparatus 120 on upper end 44, tensioning apparatus 120 includes hollow upper holder member 124 having walls defining an arm-receiving void 126 (obscured, position indicated) therein. With respect to the present preferred embodiment, reference is made to FIGS. 9 and 13, wherein upper end 44 is generally block-shaped. Accordingly, arm-receiving void 126 is of a substantially like shape so as to closely mate around the block-shaped upper end 44. Referring to FIG. 13, the opposed side surfaces 125 of upper end 44 preferably include substantially V-shaped depressions 126A. V-shaped depressions 126A are best shown in FIG. 18 (which is a top view of upper end 44) and include first wall 127 and second wall 128. Tensioning apparatus 120 is retained on upper end 44 by advancing two set screws 129 (one shown) into threaded bores (not shown) in upper holder member 124 so that the set screws 129 seat within V-shaped depression 126A. The threaded bores and first walls 127 are angled in relation to one other so that when set screws 129 are advanced into depressions 129A, upper holder member 124 cannot be removed from upper end 44.

Figure 16:
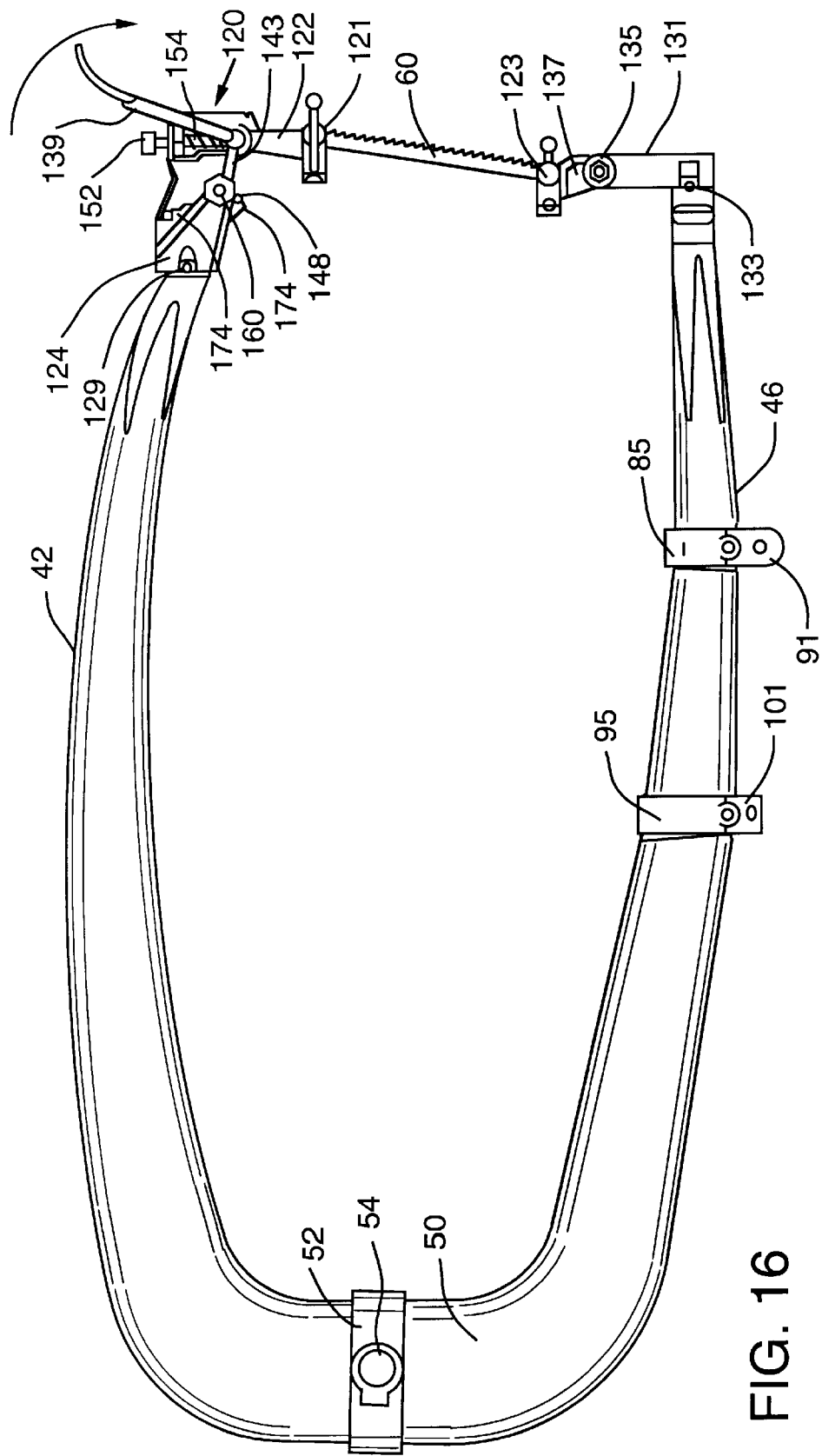
FIG. 16 is an elevational view of the C-arm of an embodiment of the scroll saw of the present invention with the saw blade tensioning apparatus of FIG. 14 attached thereto and in the tension release orientation.

In the illustrated preferred embodiment, lower end 48 includes V-shaped grooves identical to V-shaped grooves 126A of upper end 44. As shown in FIGS. 16 and 17, blade chuck 123 is coupled to lower end 48 by lower holder 131, which includes a void (not shown) shaped to receive lower end 48 and also includes two threaded bores (not shown). The threaded bores of lower holder 131 receive set screws 133 (on shown) and, in a manner identical to that discussed above, retain the lower holder 131 on lower end 48 by advancing into the V-shaped grooves 126A of lower end 48. A quick release blade chuck 131 is pivotally connected to lower holder 131 by fastener 135 which is fixedly disposed through a bore in elongated lobe 137 of blade chuck 123 and through a bore in an end of lower holder 131 opposite then end wherein set screws 133 are threadedly received.

Referring again to FIGS. 14 and 15, the functional interrelationship between the elements of tensioning apparatus 120 will be appreciated. In addition to upper holder member 124, tensioning apparatus 120 further includes tension lever 139 comprising elongated lever arm 141 and cross bar 143 depending at an angle from lever arm 141. Parallel and co-extensive first and second posts 145 and 146, respectively, extend from cross bar 143 and are spaced apart at a distance so that they may be disposed between lever pivot posts 147 and 149 of upper holder member 124. A cage member 150 is provided having a top surface 151, with a bore (not shown) therethrough, and a generally U-shaped spring cage 153 having inner and outer walls 157 and 158, respectively, defining an elongated, generally U-shaped void 155 therethrough. Support 122 depends from outer wall 158 of spring cage 153 and is disposed substantially opposite top surface 151. As shown in FIG. 15, the combination of elements including cage member 150, saw blade chuck 120 and support 122 defines a saw blade retention member 150A. Tension adjustment bolt 152 is threadedly received by the bore in top surface 151 so that a portion of the threaded region of tension adjustment bolt 152 is disposed within void 155 and is bordered on opposed sides by inner wall 157. The threaded region of tension adjustment bolt 152 within void 155 preferably receives a coil spring 154 so that the coil spring 154 is also disposed within void 155.

That portion of cross bar 143 between first and second posts 145 and 146, respectively, is positioned within void 155 between inner wall 157 and the terminus of the threaded region of tension adjustment bolt 152. When uncompressed, coil spring 154 biases that portion of cross bar 143 within void 155 against inner wall 157 opposite support 122. That portion of cross bar 143 disposed within void 155 may rotate within void 155 and, accordingly, although tension lever 139 and cage member 150 are coupled, they may rotate with respect to each other about cross bar 143. To reduce the frictional forces contacting that portion of cross bar 143 disposed within void 155 as cross bar 143 rotates, cage member 150 preferably includes screw 159 that is threaded through the wall of spring cage 153 and slightly protrudes into void 155. Cross bar 143 partially rotates against the protruding portion of screw 159, thereby reducing frictional contact between inner wall 157 and cross bar 143, extending the service life of these elements and allowing rotation to occur more easily.

Tension lever 139 is rotatably connected to upper holder member 124 by positioning first and second posts 145 and 146 between lever pivot posts 147 and 149 and threadedly advancing bolts 160 and 163 through co-axial threaded bores 165 and 167 of lever pivot posts 147 and 149, respectively, so that the ends of threaded bolts 165 and 167 are disposed within smooth bores 170 and 172 of first and second posts 145 and 146, respectively. The longitudinal axis defined by bolts 165 and 167 thereby provides a lever rotation axis about which tension lever 139 may rotate with respect to upper holder member 124. Because of the rotational coupling between tension lever 139 and cage member 150, cage member 150 is offset from the lever rotation axis. Accordingly, applying a force to lever arm 141 to rotate tension lever 139 about the lever rotation axis causes cage member 150 to revolve about the lever pivot axis.

Consideration of FIGS. 16 and 17 illustrate that by rotating tension lever 139 about the lever pivot axis, tensioning apparatus 120 may be disposed in two configurations. FIG. 16 depicts a tension release configuration for tensioning apparatus 120 wherein tension lever 139 is rotated about the lever rotation axis until stop 148 abuts stop projection 174. As depicted in the left side elevational view of FIG. 16, to place the tensioning apparatus 120 in the tension release configuration, tension lever 139 is rotated clockwise about the lever rotation axis (indicated by the curved arrow). Because cage member 150 is offset from the lever rotation axis by the length of first and second posts 145 and 146, respectively, blade chuck 121 attached to cage member 150 is pivoted away from upper holder member 124 and toward lower end 48 when the tension lever 139 is rotated to the tension release configuration. Accordingly, because blade chuck 123 is affixed to lower end 48, the distance between blade chucks 121 and 123 is reduced and the tension on the saw blade 60 is correspondingly decreased when tension lever 139 is rotated into the tension release configuration. In practice, saw blade 60 will initially be connected between blade chucks 121 and 123 when the tensioning apparatus 120 is in the tension release configuration shown in FIG. 16. Therefore, the saw blade 60 will not be in tension when the tensioning apparatus 120 is disposed in the tension release configuration.

FIG. 17 depicts a blade tensioning configuration for tensioning apparatus 120 wherein tension lever 139 has been rotated from the tension release configuration of FIG. 16 until gross bar 143 abuts cross bar stop projection 176 on upper holder member 124 (indicated by the curved arrow of FIG. 17 as being a counterclockwise rotation as viewed from the perspective of FIG. 17). The blade tensioning configuration of tensioning apparatus 120 is also shown in FIG. 14. It will be understood from comparing FIGS. 16 and 17 that by rotating tension lever 139 about the lever rotation axis from the tension release configuration to the blade tensioning configuration, cage member 150 is carried up and slightly over the lever rotation axis. The motion of the cage member 150 may be likened to a seat on a Ferris Wheel-type amusement ride; as tension lever 139 is rotated in the direction indicated in FIG. 17, cage member 150 is maintained in a substantially vertical orientation because cross bar 143 rotates relative to the cage member 150 as the tension lever 139 rotates.

As cage member 150 is displaced upward, blade chuck 121 is also carried upward toward upper blade holder 124 and the distance between blade chucks 121 and 123 increases. When the distance between blade chucks 121 and 123 increases to a point that saw blade 60 experiences a tensile force equal to the compressive force of coil spring 154 within void 155, further counterclockwise rotation of tension lever 139 about the lever rotation axis causes cross bar 143 to compress coil spring 154 and the distance between blade chucks 121 and 123 does not increase. When coil spring 154 has been compressed to the extent that cross bar 143 within void 155 impinges on the end of tension adjustment bolt 152, further counterclockwise rotation of tension lever 139 about the lever rotation axis again displaces cage member 150 upward and, consequently, increases the distance between blade chucks 121 and 123 to thereby increase the tensile forces applied to the saw blade 60.

A means for quickly and easily adjusting the tension applied to a saw blade by tensioning apparatus 120 is also provided. By threadedly advancing tension adjustment bolt 152 further into void 155, cross bar 143 will impinge on the end of the tension adjustment bolt 152 at an earlier point in the rotation of the tension lever 139 about the lever rotation axis from the tension release configuration to the blade tensioning configuration and more of the throw of tension lever 139 will be transmitted to a corresponding increase in the distance between blade chucks 121 and 123. In this way, the adjustment of tension adjustment bolt 152 into or out of void 155 will increase or decrease, respectively, the tensile forces transmitted to the saw blade 60 by the rotation of tension lever 139 into the blade tensioning configuration.

Referring to FIG. 15, by positioning cross bar stop projection 174 behind threaded bores 165 and 167, the tension lever 139 is provided with an over-center throw and the tension of the saw blade 60 maintains the cross bar 143 against the cross bar stop projection 174 when the tensioning apparatus 120 is in the blade tensioning configuration. Referring again to FIGS. 14 and 15, tensioning apparatus 120 preferably includes detent member 178 having tines 179. Tines 179 extend from upper blade holder 124 and intercept cross bar 143 to releasibly retain tension lever 139 against cross bar stop projection 174 when in the blade tensioning configuration in the event that the saw blade 60 breaks and is no longer under tension. To prevent vibration of the elements of the tensioning apparatus 120, a pad 180 of a resilient material is preferably provided and is pressure fit into bore 182 in upper blade holder 124. Outer wall 158 of cage member 150 abuts resilient pad 180 when the tensioning apparatus 120 is in the blade tensioning configuration.

It is to be understood that although the foregoing tensioning apparatus of the present invention has been described and depicted in conjunction with the composite material C-arm scroll saw of the present invention, the tensioning apparatus may be used with any apparatus wherein a member is connected between two substantially fixed attachment points and must be placed under tension. The attachment points are referred to herein as being "substantially fixed" because it is contemplated that the attachment points, for example, the ends of the two arms of a scroll saw C-arm, may be drawn together to some small extent when the blade is placed in tension.

What is claimed:

1. A sawing apparatus comprising:
   a base;
   a table portion carried on said base;
   a yoke for mounting a saw blade to the sawing apparatus for reciprocating motion about said table portion; and
   a support on said base for mounting said yoke to the sawing apparatus so that said yoke may reciprocate about a work support surface of said table portion, said yoke comprising a member adapted to be received by said support, said yoke further comprising first and second arms and a region connecting said first and second arms, each said first and second arm having an end for operably receiving an end of the saw blade, said first and second arms and said region connecting said first and second arms integrally formed from a unitary piece of fiber-reinforced composite material.

2. The sawing apparatus recited in claim 1 wherein said member adapted to be received by said support is a bracket.

3. The sawing apparatus recited in claim 1 wherein said fiber-reinforced composite material comprises a composite fiber cloth material impregnated with a polymer material.

4. The sawing apparatus recited in claim 3 wherein said composite fiber cloth comprises carbon fiber.

5. The sawing apparatus recited in claim 4 wherein said polymer material is a temperature-cured polymer material derived from a catalyzable resin.

6. The sawing apparatus recited in claim 5 wherein said polymer material is an epoxy resin.

7. The sawing apparatus recited in claim 6 wherein said first arm, said second arm, and said region connecting said first arm and said second arm are substantially hollow.

8. The sawing apparatus recited in claim 1 wherein said yoke is blow-molded from a said fiber-reinforced composite material.

9. The sawing apparatus recited in claim 1 wherein said yoke is reciprocated about said work support surface by a motor, said yoke further comprising a drive collar attachment region having an outer surface on one of said first arm and said second arm for attaching a drive collar to said one of said first arm and said second arm, said drive collar for operably connecting said motor to said yoke, said drive collar having an inner surface, said drive collar attachment region and said drive collar shaped so that said inner surface conforms to said outer surface and retains said drive collar about said drive collar attachment region.

10. The sawing apparatus recited in claim 9 wherein said outer surface of said drive collar attachment region is of a reduced cross-sectional area relative to an adjacent region of said arm.

11. The sawing apparatus recited in claim 10 wherein said outer surface of said drive collar attachment region further comprises at least one notch and wherein said drive collar further comprises at least one raised coupling projection, said raised coupling projection being disposed within said notch when said drive collar is disposed about said drive collar attachment region.

12. The yoke recited in claim 1 wherein the yoke is generally C-shaped.

13. The yoke recited in claim 1 wherein each said end of said first and second arm is adapted to receive a saw blade chuck thereon for connecting the saw blade between said first and second arms.

14. A sawing apparatus comprising:
a base;
a table portion carried on said base;
a yoke for mounting a saw blade to the sawing apparatus for reciprocating motion about said table portion;
a support on said base for mounting said yoke to the sawing apparatus so that said yoke may reciprocate about a work support surface of said table portion, said yoke comprising a member adapted to be received by said support, said yoke further comprising first and second arms and a region connecting said first and second arms, each said first and second arm having an end for operably receiving an end of the saw blade, said first and second arms and said region connecting said first and second arms being integrally composed of a fiber-reinforced composite material; and
a pivot bracket integrally molded to said region connecting said first and second arms.

15. The sawing apparatus recited in claim 14, wherein said pivot bracket further comprises two opposed pivot axis projections extending from said pivot bracket.

16. The sawing apparatus recited in claim 15, wherein said yoke is mounted for reciprocating motion about said table portion on said two opposed pivot axis projections.

17. The sawing apparatus recited in claim 16, wherein said two opposed pivot axis projections are integrally attached to said pivot bracket.

18. A sawing apparatus comprising:
a base;
a table portion carried on said base;
a yoke for mounting a saw blade to the sawing apparatus for reciprocating motion about said table portion; and
a support on said base for mounting said yoke to the sawing apparatus so that said yoke may reciprocate about a work support surface of said table portion, said yoke comprising a member received by said support, said yoke further comprising first and second arms and a region rigidly connecting said first and second arms, each said first and second arm having an end for operably receiving an end of the saw blade, said first and second arms and said region connecting said first and second arms being integrally composed of a fiber-reinforced composite material.

19. A sawing apparatus comprising:
a base;
a table portion carried on said base;
a yoke for mounting a saw blade to the sawing apparatus for reciprocating motion about said table portion;
a support on said base for mounting said yoke to the sawing apparatus so that said yoke may reciprocate about a work support surface of said table portion, said yoke comprising a member received by said support, said yoke further comprising first and second arms and a region rigidly connecting said first and second arms, each said first and second arm having an end for operably receiving an end of the saw blade, said first and second arms and said region connecting said first and second arms being integrally composed of a fiber-reinforced composite material; and
a pivot bracket integrally molded to said connecting region.

20. A sawing apparatus comprising:
a base;
a table portion carried on said base;
a yoke for mounting a saw blade to the sawing apparatus for reciprocating motion about said table portion; and
a support on said base for mounting said yoke to the sawing apparatus so that said yoke may reciprocate about a work support surface of said table portion, said yoke comprising a member adapted to be received by said support, said yoke further comprising first and second arms and a region connecting said first and second arms, each said first and second arm having an end for operably receiving an end of the saw blade, said first and second arms and said region connecting said first and second arms formed from a unitary piece of fiber-reinforced composite material and wherein the reciprocating motion of the yoke is transmitted to a bellows to alternately inflate and deflate the bellows, the yoke further comprising a bellows collar attachment region having an outer surface, said bellows collar attachment region positioned on one of said first and second arms and provided for attaching a bellows collar to said arm, said bellows collar for connecting the bellows to the yoke and having an inner surface, said bellows collar attachment region and said bellows collar shaped so that said inner surface conforms to said outer surface to retain said bellows collar about said bellows collar attachment region.

21. The sawing apparatus recited in claim 20 wherein said outer surface of said bellows collar attachment region is of a reduced cross-sectional area relative to an adjacent region of said arm.

22. The sawing apparatus recited in claim 21 wherein said outer surface of said bellows collar attachment region further comprises at least one notch and wherein said bellows collar further comprises at least one raised coupling projection, said raised coupling projection being disposed within said notch when said bellows dollar is disposed about said bellows collar attachment region.

* * * * *